(12) United States Patent
Whitehead

(10) Patent No.: US 10,993,378 B2
(45) Date of Patent: May 4, 2021

(54) APPARATUS FOR PREPARING AND APPLYING A FOLIAR SPRAY

(71) Applicant: UNIVERSITY OF JOHANNESBURG, Johannesburg (ZA)

(72) Inventor: Charles Stephen Whitehead, Johannesburg (ZA)

(73) Assignee: UNIVERSITY OF JOHANNESBURG

( * ) Notice: Subject to any disclaimer, the term of this patent is extended or adjusted under 35 U.S.C. 154(b) by 543 days.

(21) Appl. No.: 15/510,252

(22) PCT Filed: Sep. 12, 2015

(86) PCT No.: PCT/IB2015/057007
§ 371 (c)(1),
(2) Date: Mar. 10, 2017

(87) PCT Pub. No.: WO2016/038588
PCT Pub. Date: Mar. 17, 2016

(65) Prior Publication Data
US 2017/0303475 A1  Oct. 26, 2017

(30) Foreign Application Priority Data
Sep. 12, 2014 (ZA) .................. 2014/06720

(51) Int. Cl.
*A01G 7/02* (2006.01)
*C02F 1/42* (2006.01)
(Continued)

(52) U.S. Cl.
CPC ............. *A01G 7/02* (2013.01); *B01D 15/362* (2013.01); *B01D 61/025* (2013.01); *B05B 7/32* (2013.01);
(Continued)

(58) Field of Classification Search
CPC ........ A01G 7/02; B01D 15/362; B01D 15/36; B01D 61/025; B01D 61/02; B05B 7/32;
(Continued)

(56) References Cited

U.S. PATENT DOCUMENTS

2014/0283452 A1 *  9/2014  Dittman ................. A01G 31/06
47/62 R

FOREIGN PATENT DOCUMENTS

WO   WO-2004040981 A1 *  5/2004  ............. A01N 59/04
WO   WO-2008038165 A2 *  4/2008  ............... C05G 5/23

OTHER PUBLICATIONS

International Search Report for PCT/IB2015/057007, dated Jan. 22, 2016.
(Continued)

*Primary Examiner* — Robert Clemente
*Assistant Examiner* — Akash K Varma
(74) *Attorney, Agent, or Firm* — Marshall, Gerstein & Borun LLP

(57) ABSTRACT

The invention relates to an apparatus for applying foliar spray. The apparatus (1) includes supply means (2) in the form of a water tank (4) with pipe (5) extending from the tank, through a reverse osmosis water filtration unit (12), pump (6), and valve (7). A solute container (8) for holding solute (9) in the form an electrolyte solution of sodium ions (Na+) and bicarbonate ions (HCO3-) formed by mixing sodium bicarbonate and water (3) from the supply means (2) is also included. A combinatory part (10) is connected to an ion exchange part (15) through valve (19), pipe (17) and pump (18). The prepared solution is the product of passing the diluted electrolyte solution (11) through the ion exchange column (15) and may be applied to the foliage of plants (26) through pump (27), pipes (28), and finally micro sprayers (29).

16

(51) Int. Cl.
*B01D 15/36* (2006.01)
*B05B 7/32* (2006.01)
*B01D 61/02* (2006.01)
*C05D 7/00* (2006.01)
*C02F 1/44* (2006.01)

(52) U.S. Cl.
CPC ............... *C02F 1/42* (2013.01); *C02F 1/441* (2013.01); *C05D 7/00* (2013.01); *C02F 2001/425* (2013.01)

(58) Field of Classification Search
CPC .... C02F 1/42; C02F 1/441; C02F 1/44; C02F 2001/425; C05D 7/00
USPC .......................................................... 210/143
See application file for complete search history.

(56) References Cited

OTHER PUBLICATIONS

Written Opinion of the International Searching Authority for International Application No. PCT/IB2015/057007, dated Jan. 22, 2016.

\* cited by examiner

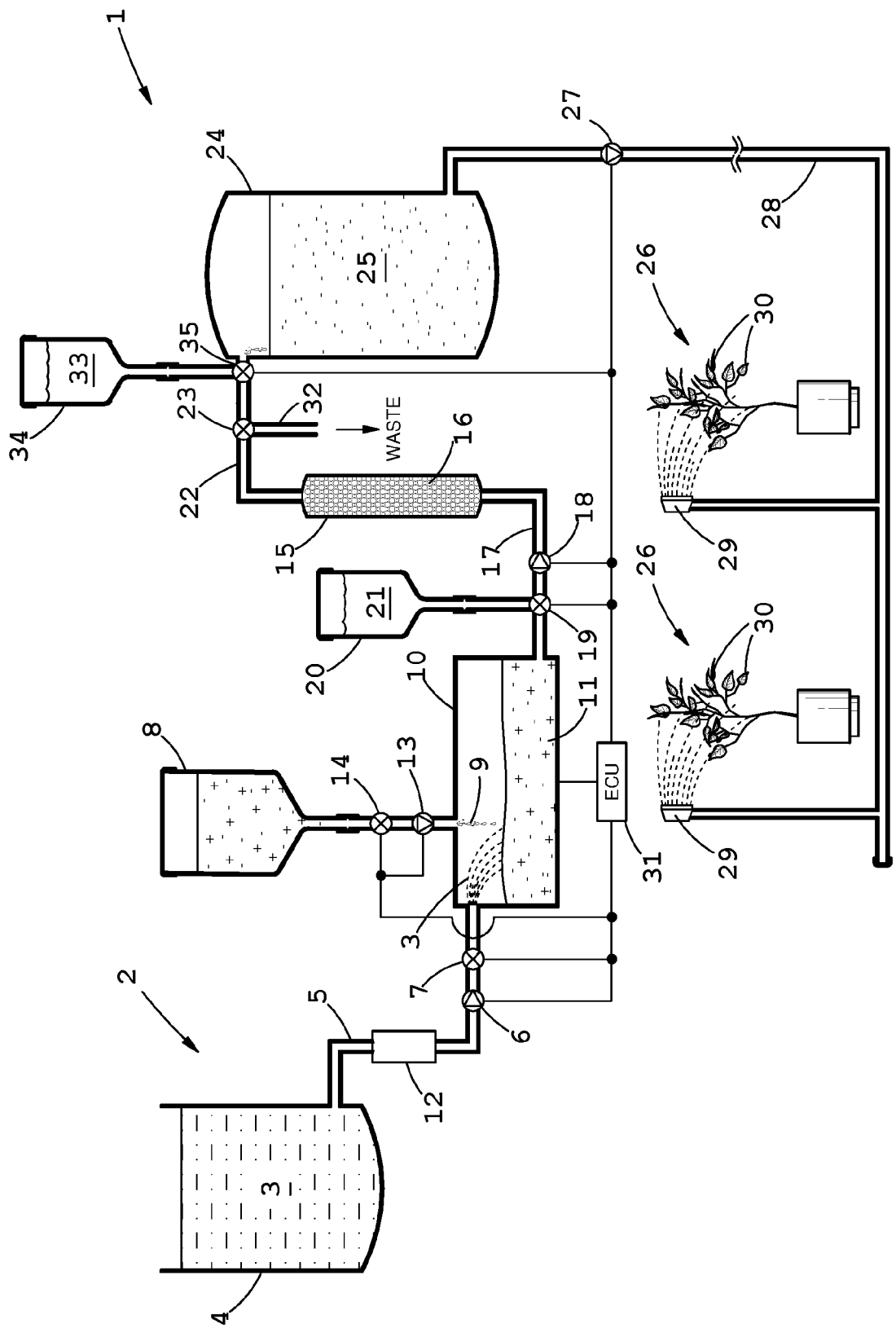

APPARATUS FOR PREPARING AND APPLYING A FOLIAR SPRAY

CROSS-REFERENCE TO RELATED APPLICATION

This is the United States national phase of International Patent Application No. PCT/IB2015/057007, having an international filing date of Sep. 12, 2015, and which claims the priority benefit of ZA 2014/06720, filed Sep. 12, 2014. The entire contents of each of the foregoing is expressly incorporated herein by reference.

FIELD OF THE INVENTION

The invention relates to an apparatus for applying foliar spray and more specifically, but not exclusively, to an apparatus for applying a carbon rich foliar spray.

BACKGROUND TO THE INVENTION

It is widely known that the concentration of carbon dioxide (CO2) in the atmosphere is sub-optimal for plant growth and photosynthesis. Farmers growing plants in enclosed greenhouses often increase the concentration of CO2 therein to provide closer to optimal concentrations for plant growth. Gaseous CO2 has high costs associated with preparation and, due to global carbon dioxide taxation and restriction, farmers may be restricted from using CO2 in greenhouses.

World Intellectual Property Organization ("WIPO") publication number WO2004/040981 describes a method for enriching CO2 concentration in a plant environment and a solution for use in treating plants so as to increase CO2 concentrations therein. The method comprises the step of applying a bicarbonate or carbonate solution—to the plant environment, and more specifically applying the bicarbonate or carbonate solution to roots and/or foliage of plants. The method may include the step of pre-activating the bicarbonate or carbonate solution before application to enhance ready availability of CO2 to the plants in the form of bicarbonate ions, by pre-treating the solution in a flow through electrolytic module. The bicarbonate or carbonate solution is prepared from a dilute bicarbonic and/or carbonic acid and/or from their various corresponding bicarbonate and/or carbonate salts, and may also contain small amounts of various organic acids, such as methanoic, ethanoic (acetic), propionic or similar acids and/or their corresponding salts.

WIPO publication number WO2008/038165 discloses a method for providing nutrients to a plant, a nutrient feed solution containing such nutrients, and a process and composition for obtaining the nutrient feed solution. In particular, the invention provides a nutrient feed solution, particularly a dilute inorganic acid solution, for application to the aerial parts of a plant, wherein the nutrient feed solution comprises nutrients having molecules that are sufficiently small to pass rapidly through a plant cuticle.

(the aforementioned applications referred to hereinafter collectively as "the prior art")

A problem with the prior art is that the method includes the step of electrochemically activating the carbonic solution and such electrochemical process leaves undesirable byproducts which may be harmful to the environment. A further problem with the prior art is that it does not disclose an apparatus for preparing and applying such a carbonic solution.

OBJECT OF THE INVENTION

It is accordingly an object of the invention to provide an apparatus for preparing and applying a foliar spray which, at least partially, alleviates some of the problems associated with the prior art.

SUMMARY OF THE INVENTION

In accordance with the invention there is provided an apparatus for preparing and applying a foliar spray comprising:
   supply means for supplying water;
   a solute container for holding solute;
   a combinatory part for combining the solute with water from the supply means for forming an electrolyte solution; and
   an ion exchange part for removing ions from the electrolyte solution to form the prepared solution.

The apparatus may include a water purification part for removing impurities or unwanted elements from the water of supply means. The purification part may be a water filter or a reverse osmosis (RO) unit, specifically a flow through RO unit.

The apparatus may include a prepared solution container for holding the prepared solution. The prepared solution container may be sealed and/or pressurized.

The apparatus may further include application means for applying a foliar spray of the prepared solution to plants. The application means may include a combination of pumps, pipes, sprayers, micro-sprayers, misters, and/or foggers for applying the prepared solution to foliage of plants.

The apparatus may include control unit for controlling at least the combinatory part. The control unit may be an electronic control unit.

The apparatus may include a regeneration part or a loading part for regenerating or loading the ion exchange part. The regeneration part may include a container and pump. The container may hold a diluted hydrochloric acid and water solution.

The supply means may include a water container, a pipe and a pump. Alternatively the supply means may be provided in the form of a pressurized water supply, such as a municipal water supply line. The supply means and water pressure and flow rate may be controlled by the control unit.

The solute may be sodium bicarbonate or a solution of sodium bicarbonate and water. The concentration of the water and sodium bicarbonate solution may be between 4.0 g/l and 40.0 g/l.

The combinatory part may dilute the solute with water from the supply means to form the electrolyte solution.

The electrolyte solution may be formed by mixing sodium bicarbonate and water to form an electrolyte solution of sodium ions (Na+) and bicarbonate ions (HCO3-).

The combinatory part may include a mixing container and measurement means wherein the measurement means measures the amount of water and solute to be combined to form a predetermined concentration of electrolyte solution. The measurement means may be connected to and controlled by the control unit wherein the flow rate of water and electrolyte solution may be measured to determine the concentration of electrolyte solution to water.

The predetermined concentration of the electrolyte solution may be between 100 mg/l and 800 mg/l of solute to water.

The ion exchange part may be an ion exchange column including a cation exchange.

The ion exchange column may, at least partially, remove or absorb Na+ ions from the electrolyte solution to form the prepared solution.

The prepared solution may further include a nutrient solution including nutrients which may be absorbed through the foliage of plants.

The prepared solution may contain a surfactant. The surfactant may be a wetting agent.

In accordance with a second aspect of the invention there is provided a prepared solution comprising:
  water; and
  bicarbonate ions dissolved in the water;
  the proportion of bicarbonate ions to other ions dissolved in the water being between 100 and 800 mg/l.

The prepared solution may further include a nutrient solution including nutrients which may be absorbed through the foliage of plants.

The prepared solution may contain a surfactant. The surfactant may be a wetting agent.

In accordance with a third aspect of the invention there is provided a method of preparing a solution for foliar application comprising:
  mixing sodium bicarbonate and water to form an electrolyte solution;
  removing sodium ions from the electrolyte solution; and
  providing the solution for foliar application.

The step of removing the sodium ions may be performed using an ion exchange column.

The method may include the step of preparing a prepared solution with an apparatus as described above.

The method may further include the step of storing the prepared solution. The solution may be stored in a sealed container and may be under pressure.

In accordance with a fourth aspect of the invention there is provided a method of applying a prepared solution to plant foliage comprising:
  preparing the prepared solution according to the method described above using the apparatus as described above; and
  applying the prepared solution to foliage of plants by spraying the plants with the solution using:
    crop dusting or aerial application with an agricultural aircraft;
    manually applying the solution to plants using portable sprayers

BRIEF DESCRIPTION OF THE DRAWINGS

An embodiment of the invention is described below, by way of a non-limiting example only, and with reference to the accompanying drawing in which:

FIG. 1—is a schematic diagram of an apparatus for preparing and applying a foliar spray to plants.

DETAILED DESCRIPTION OF THE DRAWINGS

With reference to the drawings, in which like features are indicated by like numerals, an apparatus for preparing and applying a foliar spray is generally indicated by reference numeral 1.

The apparatus 1 includes supply means 2 for supplying water 3 to the apparatus. In this example, the supply means 2 is in the form of a water tank 4 with pipe 5 extending from the tank, through a reverse osmosis water filtration unit 12, pump 6, and valve 7. Alternatively the supply means may be provided in the form of a pressurized water supply, such as a municipal water supply line. The supply means and water pressure and flow rate may be controlled by the control unit.

A solute container 8 for holding solute 9 in the form an electrolyte solution of sodium ions (Na+) and bicarbonate ions (HCO3-) formed by mixing sodium bicarbonate and water 3 from the supply means 2. The concentration of the solute 9 may be between 1.0 g/l and 8.0 g/l sodium bicarbonate to water. Typically the solute 9 is premixed to a concentration of about 4.0 g/l. The apparatus includes a combinatory part 10 which is connected to the supply means 2 through pump 6 and valve 7 and to the solute container 8 through pump 13 and valve 14. The combinatory part 10 combines the solute 9 with water 3 from the supply means 2 for forming a diluted electrolyte solution 11. The preferred concentration of the diluted electrolyte solution is 400-800 mg/l achieved by mixing 9 parts of water with 1 parts of electrolyte solution. A 1 in 10 dilution may be achieved with a venturi valve, or alternatively by using a dosage pump a different dilution factor may be obtained.

The combinatory part 10 is further connected to an ion exchange part 15 through valve 19, pipe 17 and pump 18. The valve 19 is a three-way directional control valve which either allows the diluted electrolyte solution 11 to flow to the column 15 or a diluted hydrochloric acid solution 21 from the regeneration part 20 to pump 18.

The ion exchange part is in the form of an ion exchange column 15 with cation resinous beads 16 therein. At the lower end of the column 15 a pipe 17 extends between pump 18 and the column 15. At the upper end thereof a pipe 22 connects the output of column 15 to a prepared solution container 24 an ion exchange part for removing ions from the electrolyte solution to form the prepared solution. The prepared solution container 24 is sealed, may be pressurized, and holds the prepared solution 15. It is important to keep the prepared solution container sealed or under pressure to prevent the dissolved anions from reacting and being released from the solution. The prepared solution is the product of passing the diluted electrolyte solution 11 through the ion exchange column 15. The column 15 removes positively charged Sodium cations (Na+) from the solution 11. The prepared solution now contains mostly negatively charged bicarbonate anions (HCO3-) and may be applied to the foliage of plants 26 through pump 27, pipes 28, and finally micro sprayers 29. Instead of micro-sprayers, misters, or foggers, a combination thereof may be used to apply the prepared solution to foliage 30 of the plants 26.

The apparatus 1 includes an electronic control unit (ECU) 31 which is connected to, and can actuate, at least the pump 6, valve 7, pump 13, valve 14, pump 18, valve 19, valve, 23, and pump 27. The ECU 31 is typically programmable to schedule the operation of the pumps and valves. Further, the ECU 31 may include sensors (not shown), for example, to monitor the levels in containers (4, 8, 20, and 24), or to measure the amount of sodium cations (Na+) still present in the prepared solution 25 or in pipe 22. The ECU 31 may be in the form of, or include, programmable logic controllers (PLCs), microcontrollers, actuators, and/or communication means. The apparatus 1 may further include a nutrient container 34, which holds a nutrient solution 33. The nutrient solution may also contain a surfactant, allowing better wetting of plants 30. The nutrient solution may be added to the prepared solution 25 prior to application thereof and is controlled by the ECU 31 through valve 35. At this stage, a sensor for measuring the pH or conductivity of the prepared solution may be used, connected to the ECU 31.

In use, the ECU 31 is, for example, programmed to apply the prepared solution 25 to the plants 26 four times per day during daylight hours. Provided that the apparatus 1 is prepared by providing water 3 in the tank 4, providing the premixed solute 9 in the solute container 8, providing the dilute hydrochloric acid solution in the regeneration container, the operation is initiated by opening valves 6 and 14 and using pumps 7 and 13. At this stage the ratio of water 3 to solute 9 may be controlled by pumping the water 3 and solute 9 at different rates. The water 3 and solute 9 are combined in the combinatory part 10 until the combinatory container is filled with the diluted electrolyte solution 11.

The ECU activates pump 18 to pump the diluted electrolyte solution 11 through the ion exchange column 15. In the column 15, the sodium cations (Na+) are absorbed by the resinous beads 16 in the column 15. The solution 11 needs to flow slowly through the beads 16 to ensure maximal adsorption of the sodium cations. As the prepared solution is stored in the prepared solution container 24 until the amount of prepared solution 25 is enough for application. Once the container 24 has enough solution 25, pump 27 is actuated to flow the prepared solution 25 through pipes 28 and sprayers 29 to the foliage 30 of the plants 26.

When all of the prepared solution is applied, the ECU will repeat the process to prepare a suitable amount of new prepared solution 25. If enough time has elapsed between the previous application and the preparation of the new prepared solution the ECU will immediately actuate pump 27 to apply the new prepared solution 25 to the plants 26. Alternatively, should enough time not have passed, the ECU 31 may delay application until the predetermined amount of time has elapsed. In the current example, the solution 25 is applied to the plants approximately every 3 hours during daylight.

When the plants have received at least four applications of prepared solution, once every three hours, the ion exchange column may be regenerated. To do this the ECU 31 actuates valve 19 to allow flow from container 20 and block flow from the combinatory part 10. Further, valve 23 is actuated to block flow to container 24 and to guide flow through pipe 32 which typically leads to a drain or other waste disposal mechanism. If the water source 2 is large enough, for example where the water source is in the form of a dam, pipe 23 may lead back to the water source. The ECU 31 actuates the pump 18 which pumps the diluted hydrochloric acid solution 21 through the ion exchange column 15. The hydrochloric acid solution replaces the sodium cations adsorbed by the beads 16 to form a harmless sodium chloride (NaCl) or table salt solution. The solution should still be acidic and should not be applied to the plants or pumped back to the water source unless the water source is sufficiently large such that it will not have a substantial effect, or the solution is sufficiently neutralized. The column 15 is now regenerated and the apparatus will not be used during night time. The process is repeated the following day to allow for continuous application of the prepared solution to the plants throughout the season.

It is envisaged that the invention will provide an apparatus for preparing and applying a foliar spray to increase carbon uptake in the plant for photosynthesis.

The invention is not limited to the precise details as described herein. For example, instead of using micro sprayers, foggers or misters may be used. The prepared solution may also be stored or bottled and applied manually or by crop dusting.

The invention claimed is:

1. An apparatus for preparing and applying a bicarbonate ion foliar spray comprising:

supply means for supplying water;

a solute container for holding solute;

a combinatory part for combining the solute with water from the supply means for forming an electrolyte solution;

the electrolyte solution including cations and bicarbonate anions;

an ion exchange column with cation exchange for removing ions from the electrolyte solution to form a prepared solution, wherein the ion exchange column, at least partially, removes cations from the electrolyte solution to form the prepared solution with a relatively higher bicarbonate ion concentration; and a prepared solution container for holding the prepared solution under pressure for application, wherein the prepared solution container is sealed and pressurized to prevent dissolved anions from reacting and being released into the prepared solution.

2. The apparatus for preparing and applying a bicarbonate ion foliar spray of claim 1 wherein the apparatus includes a water purification part for removing impurities and unwanted elements from the water of the supply means.

3. The apparatus for preparing and applying a bicarbonate ion foliar spray of claim 2 wherein the purification part includes a water filter.

4. The apparatus for preparing and applying a bicarbonate ion foliar spray of claim 2 wherein the purification part includes a reverse osmosis unit.

5. The apparatus for preparing and applying a bicarbonate ion foliar spray of claim 1 wherein the apparatus includes application means for applying a foliar spray of the prepared solution to plants.

6. The apparatus for preparing and applying a bicarbonate ion foliar spray of claim 1 wherein the apparatus includes control unit for controlling at least the combinatory part.

7. The apparatus for preparing and applying a bicarbonate ion foliar spray of claim 6 wherein the control unit is an electronic control unit.

8. The apparatus for preparing and applying a bicarbonate ion foliar spray of claim 1 wherein the apparatus includes a loading part for loading the ion exchange column.

9. The apparatus for preparing and applying a bicarbonate ion foliar spray of claim 1 wherein the solute is a solution of sodium bicarbonate and water.

10. The apparatus for preparing and applying a bicarbonate ion foliar spray of claim 9 wherein a concentration of the water and sodium bicarbonate solution is between 4.0 g/l and 40.0 g/l.

11. The apparatus for preparing and applying a bicarbonate ion foliar spray of claim 1 wherein the combinatory part dilutes the solute with water from the supply means to form the electrolyte solution.

12. The apparatus for preparing and applying a bicarbonate ion foliar spray of claim 1 wherein the electrolyte solution is formed by mixing sodium bicarbonate and water to form an electrolyte solution of sodium ions (Na+) and bicarbonate ions (HCO3-).

13. The apparatus for preparing and applying a bicarbonate ion foliar spray of claim 1 wherein the combinatory part includes a mixing container and measurement means wherein the measurement means measures an amount of water and solute to be combined to form a predetermined concentration of electrolyte solution.

14. The apparatus for preparing and applying a bicarbonate ion foliar spray of claim 13 wherein the predetermined concentration of the electrolyte solution is between 100 mg/l of solute to water and 800 mg/l of solute to water.

15. The apparatus for preparing and applying a bicarbonate ion foliar spray of claim 1 wherein the ion exchange column, at least partially, removes Sodium (Na+) ions from the electrolyte solution to form the prepared solution.

16. The apparatus for preparing and applying a bicarbonate ion foliar spray of claim 1, wherein the prepared solution is the electrolyte solution containing dissolved bicarbonate ions.

* * * * *